United States Patent [19]

Müller

[11] 4,138,862
[45] Feb. 13, 1979

[54] COOLING APPARATUS

[76] Inventor: Arnold Müller, 31 Lichtensteinstrasse, Kirchheim/Teck, Fed. Rep. of Germany

[21] Appl. No.: 730,907

[22] Filed: Oct. 8, 1976

[30] Foreign Application Priority Data

Oct. 9, 1975 [DE] Fed. Rep. of Germany ....... 2545304

[51] Int. Cl.² .......................................... F25B 39/04
[52] U.S. Cl. ...................................... 62/508; 62/434; 310/54; 310/57; 310/64; 417/368
[58] Field of Search ............... 62/505, 434, 435, 508; 310/54, 57, 64; 417/368, 419

[56] References Cited

U.S. PATENT DOCUMENTS

| 2,249,882 | 7/1941 | Buchanan | 62/505 |
| 3,089,045 | 5/1963 | Derks | 310/54 |
| 3,480,810 | 11/1969 | Potter | 310/54 |
| 3,629,628 | 12/1971 | Rank et al. | 310/54 |
| 3,904,901 | 9/1975 | Renard et al. | 310/54 |

Primary Examiner—Ronald C. Capossela
Attorney, Agent, or Firm—William Anthony Drucker

[57] ABSTRACT

A refrigerator having a cooled induction motor, the housing interior of which is completely filled with a cooling medium, and having a cooler for the re-cooling of the cooling medium in the housing interior by means of another medium separate from the cooling medium of the motor, in which insulating cooling oil is contained as cooling medium in the housing interior of the induction motor.

1 Claim, 4 Drawing Figures

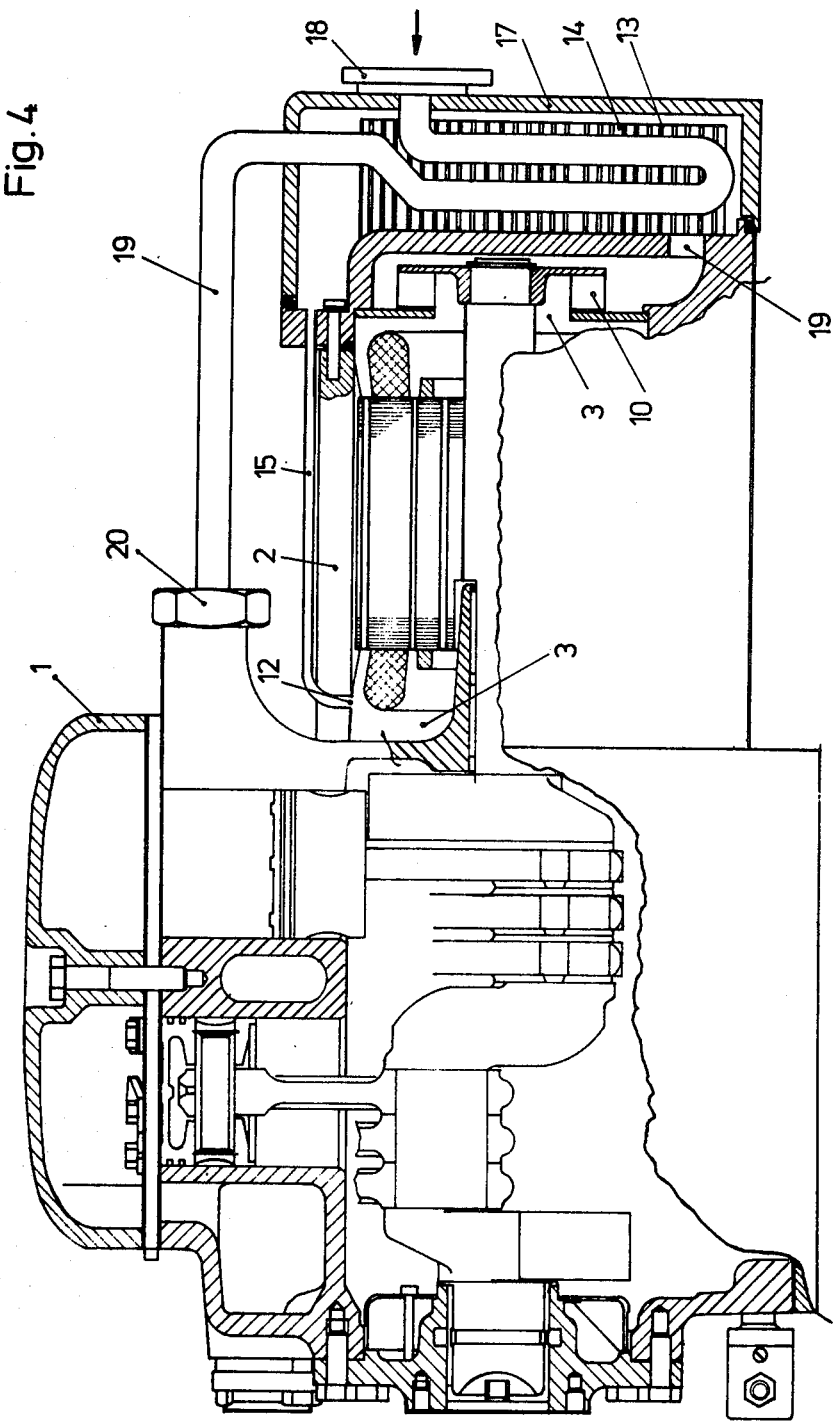

COOLING APPARATUS

BACKGROUND OF THE INVENTION

1. Field of the Invention

This invention relates to a refrigerator, a compressor or the like having a cooled induction motor the interior of the housing of which is completely filled with a cooling medium, and having a cooler for the re-cooling of the cooling medium, in the housing interior by means of another medium separate from the cooling medium of the motor.

2. Description of the Prior Art

Since as is known refrigerating machines in general are hermetically enclosed, the motor of the compressor must be specially cooled. In this case the cooling is effected by the refrigerant, since this is already cooled in the refrigerant conduit. Such cooling of the motor has however the decisive disadvantage that the motor can be destroyed within a short time by the refrigerant. The latter is chemically very aggressive and mostly at the same time also more or less soiled. Thus the drive motors must be provided with special insulations in order to reduce the susceptibility to troubles as far as possible. Moreover on failure of a motor the whole of the refrigerant in the cooling system must be replaced. This is rather toilsome and time-consuming, while at the same time the refrigerating plant is stopped.

SUMMARY OF THE INVENTION

According to this invention this serious disadvantage can be thoroughly and decisively eliminated in that the housing interior of the motor for the compressor of the refrigerator or compressor or the like is completely filled with oil or the like or with another insulating medium and the re-cooling of the latter takes place with the use of another medium separate therefrom. The oil or the like or another insulating medium of a type known per se. used here, is neutral and harmless to the motor so that the latter cannot be destroyed. The re-cooling of the oil or the like is effected by another medium completely separate therefrom, for example by an air current or water or another agent or by the refrigerant of the refrigerator.

The oil or the like used for cooling the motor passes from the interior of the housing through an exit opening by means of a connecting conduit through a cooler and thereupon through a return flow opening or even several such openings into the interior of the motor again. Thus a cooling cycle is formed which is hermetically closed off from the compressor and from the entire cooling installation.

A circulating pump, which is driven by the motor shaft or by a separate motor, is arranged on the motor or its outer mounting plate or cover directly or separately therefrom. Moreover the cooler can be arranged on the housing or beside or around the housing of the motor or of the mounting plate, according to requirement. The motor itself is connected to the compressor on a partition of the latter or separately therefrom as flanged motor, the shaft being common in each case. Moreover a fan can be arranged on the shaft which cools the cooler by the air current generated by it.

According to the further invention the cooler can be enveloped by a separate housing or jacket in which the cooling of the oil or the like takes place by an air current conducted through or by the refrigerant flowing through the refrigerator. The circulating pump or the cooler can be fitted either on the motor or on the mounting plate or outside thereof, for one or more compressors in each case. The connecting conduit moreover passes through the cooler and its cooling fins in serpentine form with simultaneous washing by the air current or the refrigerant. It is also especially advantageous that the oil can flow through the connection opening on the circulating pump directly into the cooling housing of the cooler, in which a special pipe conduit is installed for the air current or the refrigerant.

Thus the connecting conduit of the oil or the like can be conducted through the condenser of the machines. The same is also possible over a part of the evaporator, so that on account of the still warmed oil, freezing of the evaporator is prevented and thus a greater cooling performance occurs. Moreover the delivered heat energy is here taken up by the refrigerant and thus added to the cooling cycle.

Thus the invention solves the problem of obtaining a refrigerator or a compressor or the like, in which not only is the motor for the compressor satisfactorily specially cooled, but this cooling takes place completely independently of the cooling of the machine by the refrigerant, so that the latter cannot destroy the motor. At the same time the advantage is obtained that the heat energy generated by the motor can be added to the cooling system, independently thereof. Moreover a motor of ordinary construction is to be used by the constant intensive cooling of which the performance is increased many times. The individual parts of the object of the invention can here be constructed and arranged in any desired manner according to need, so that such an installation is not only reliable in operation but also easily adaptable to the conditions in each case. The trouble susceptibility is decisively reduced.

According to the further invention such a refrigerator can also be used for heating purposes and air-conditioning installations, so that a system after the style of a heat pump is produced which can also be operated with cheap off-peak current. For this purpose the refrigerator is connected to a condenser which however is accommodated within an insulated additional housing or tank. In the latter neutral heating oil or the like is accommodated, while the refrigerating cycle leads from the condenser through an expansion valve to the evaporator and then to the suction conduit of the compressor and thereupon from the delivery side back to the condenser.

At the same time the cooling oil of the motor is conducted over one side of the evaporator so that the lost energy occurring in the motor is fed to the cooling medium as heat in the evaporator. External air flows through the evaporator itself for example by way of a fan, so that the temperature difference between the boiling temperature of the refrigerant and the air temperature is converted by the evaporator into useful heat. After compression by the compressor the refrigerant is returned into the condenser again.

In the condenser now the heating oil situated in the mentioned insulated housing or tank, or another suitable liquid for example water, is heated to a temperature of about 70° C. The heating oil is thus likewise warmed, so that the heat transmission, through a heating coil inserted in the said housing or tank, warms a conduit system which in the usual way is used for heating or for producing hot water in a dwelling or utilisation area. Since the utilised heating oil possesses a great heat storage capacity, the heating of the heating oil by means of the compressor can also take place at night, so that the cheap night tariff can be exploited. The same also applies to a storage tank of a type usual per se, provided here, for the production of hot water (for example for the heating of swimming baths or the like).

The above-described system can also be converted by exchange of the condenser and the evaporator in summer, so that the cooled water can be used in the hot season. Then it is merely necessary to provide radial fans and the like under the individual heating bodies, which bring in the surrounding air, the heating bodies being re-heated accordingly by the surrounding air so that by the withdrawal of the cooling energy a complete air-conditioning plant is produced. The occurrence of water of condensation on account of the water temperature cooled down to about 7° C. is also prevented here.

BRIEF DESCRIPTION OF THE DRAWINGS

FIG. 4 shows an example with cooling of the oil in accordance with the example according to FIGS. 2 and 3, in a further modified form of embodiment.

DESCRIPTION OF THE PREFERRED EMBODIMENTS

Figure 1:
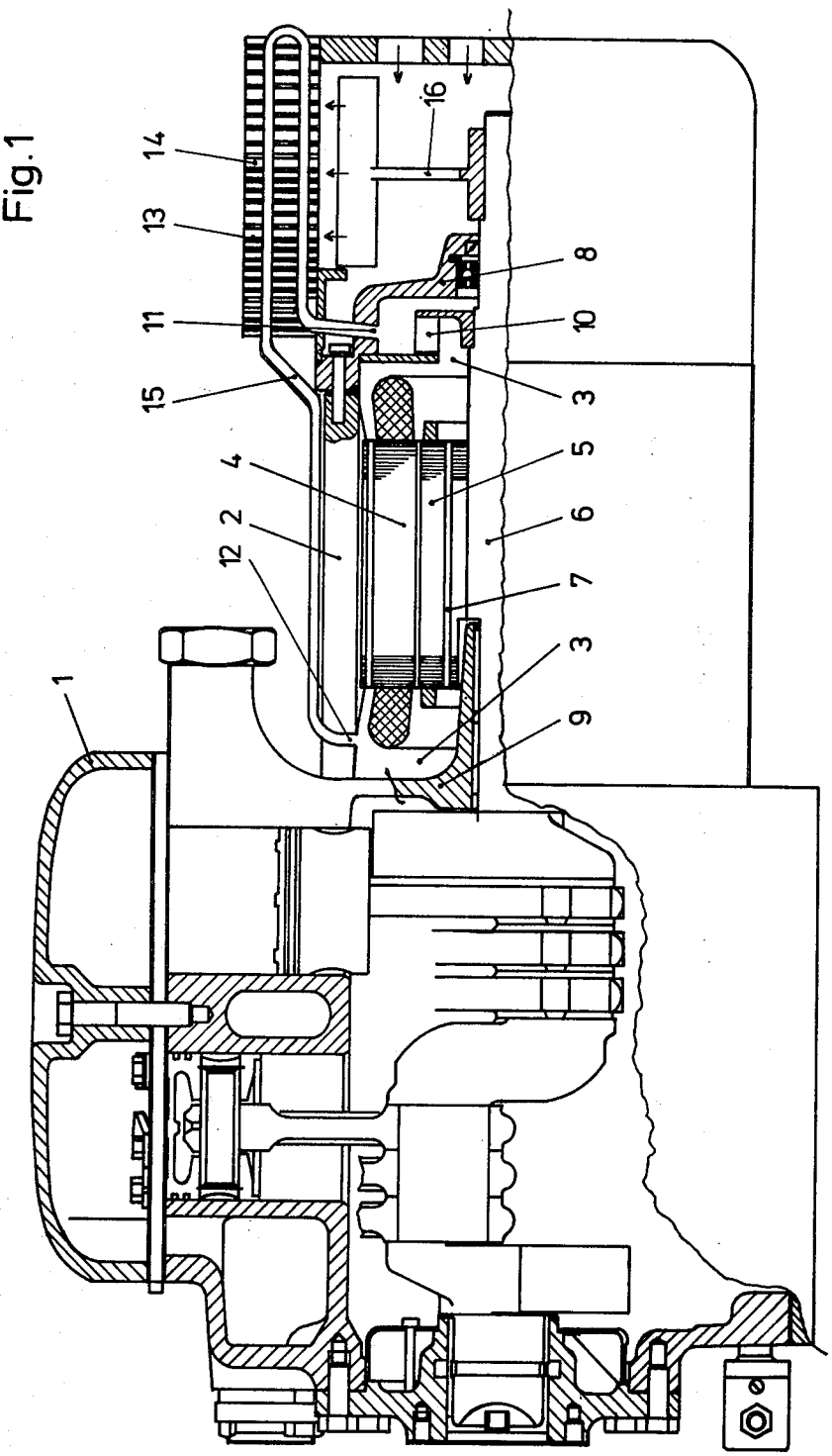
FIG. 1 shows an example with cooling of the oil by a fan.

The example according to FIG. 1 shows a compressor as a whole for a refrigerator, on one side of which an induction motor 2 is provided of ordinary construction with stator 4 and rotor 5 in the housing interior 3 and with the shaft 6 which forms one unit with the shaft of the compressor. The motor 2 can be secured as flanged motor to the compressor 1 or is seated directly on its housing or on the gas-tight partition 9. The entire housing interior 3 is filled with oil which flows through the motor 2. In a known manner if necessary longitudinal bores 7 can here be provided in the rotor 5 and in the stator 3 or flattened portions can be provided in the latter for the purpose of better oil throughflow.

In the externally situated mounted plate 8 a circulating pump 10 is installed, the oil or the like entering the pump 10 directly from the housing interior 3 and passing to the exterior again through the outlet opening 11. Thence the oil flows through the correspondingly dimensioned and laid connecting conduit 15 to the return opening 12 at the other end of the motor 2, along the compressor 1. Through this opening 12, or several thereof, the oil passes into the housing interior 3 again so that the cycle of the oil is closed. The connecting conduit 15 here flows through the cooler 14 with the cooling fins 13, in which the heated oil coming from the motor 2 is cooled and thereupon fed to the motor 2 again. Thus the cycle is completely independent of the refrigerant cycle and hermetically sealed from the latter.

Low-acid oil or the like or equally another insulating medium is suitable for the cooling of the motor, so that the windings of the motor can be insulated as usual and no special measures have to be taken for the protection of the motor. The circulating pump 10 can be arranged either directly in or on the mounting plate 8 or separately therefrom, being driven either by the motor shaft 6 or by a separate motor.

The cooler 14 can be arranged as desired and can be fitted for example on the housing of the motor 2 or be seated beside or on the latter or on the mounting plate 8, as illustrated in FIG. 1. A central arrangement above the motor 2 or above the mounting plate 8 is also possible. In the example of embodiment furthermore a fan 16 is seated on the motor shaft 6, cooling the attached cooler 14 by the air current generated by the fan.

Figure 2:
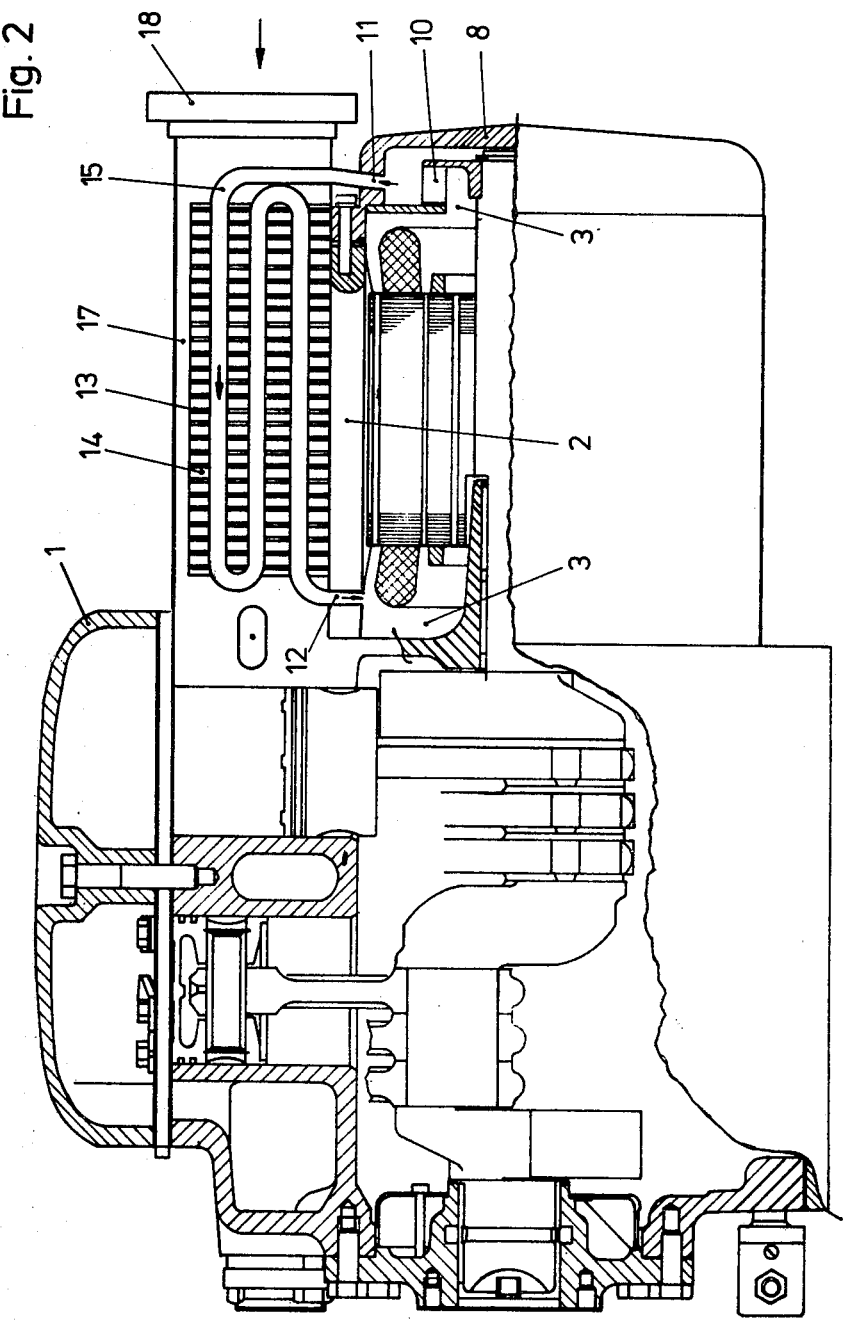
FIG. 2 shows an example with cooling of the oil by the refrigerant.

The example according to FIG. 2 is assembled similarly to the example according to FIG. 1, the same reference being valid for the individual parts. The cooler 14 is here arranged above the motor 2 and the connecting conduit 15 is conducted in serpentine form therein and brings the oil from the outlet opening 11 directly to the return opening 12. Moreover the cooler 14 is enveloped by a housing or jacket in which the cooling of the oil or the like is effected by an air current conducted through or by the refrigerant flowing through the refrigerator. In this case the refrigerant is sucked in through the suction opening 18 in the housing 17 and leaves the latter at the other end of the housing 17 to enter the compressor 1. In this way the oil flowing through the connecting conduit 15 is cooled by the refrigerant and complete separation of the two media is guaranteed. In place of the refrigerant the cooler 14 can also be cooled by through-flowing air, water or the like.

Figure 3:
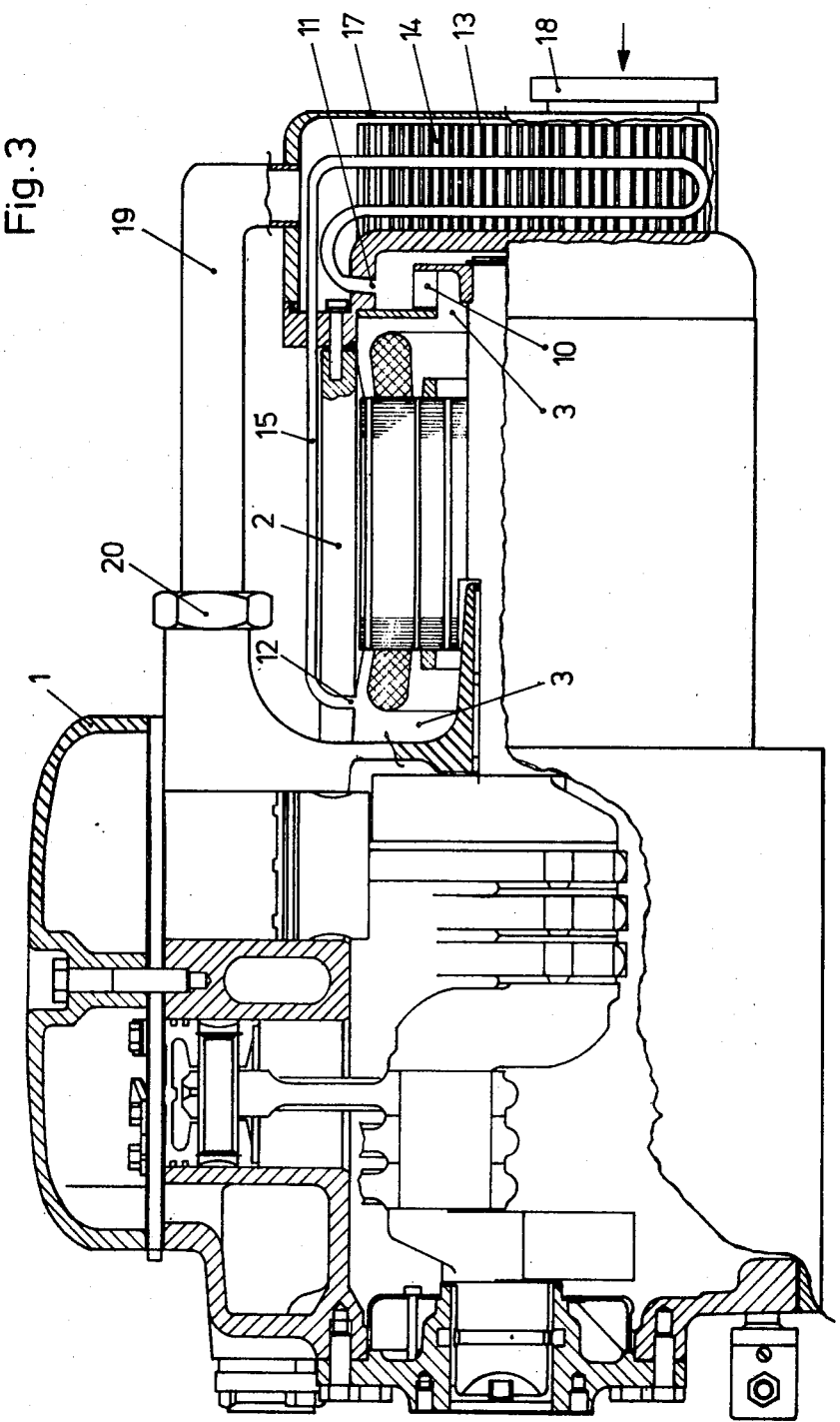
FIG. 3 shows an example with cooling of the oil in accordance with the example of FIG. 2, but in modified embodiment.

Conditions are similar in the example according to FIG. 3 where the housing 17 is flanged laterally to the mounting plate or cover 8 of the motor 2. Thus the cooler 14 is penetrated perpendicularly by the connecting conduit 15 and the suction opening 18 is situated downward and laterally, while the suction conduit or refrigerant conduit 19 departs upwards and laterally and leads to the connection 20 on the compressor 1. The effect is here the same as in the example according to FIG. 2. Moreover the cooler may not be fitted only on the motor 2 or on the mounting plate or cover 8; the same is also possible outside the motor, for one or more compressors in each case.

An outlet port (not visible in this sectional drawing) of the compressor 1 is connected by a pipe 21 to an inlet 33 of a condenser 22, shown by the conventional sign for a heat exchanger. The corresponding outlet 24 of the condenser 22 is connected by a pipe 25 to the suction opening 18. The condenser 22 has an inlet 26 and an outlet 27 for cooling water to cool the refrigerant which has become heated as a result of compression.

The example according to FIG. 4 differs from the examples 1–3 in that the oil from the connection opening 11 flows directly into the cooling housing 17 of the cooler 14 so that the connecting conduit 15 extends from the cooling housing 17 to the return opening 12. The conduit 19 here passes through the cooler 14 situated in the cooling housing 17 from the suction opening 18 and leads to the connection 20 on the compressor 1. Here again a complete separation of the refrigerants utilised for cooling takes place, whereby the intended decisive improvement of a refrigerator or compressor is guaranteed within the meaning of the invention.

I claim:

1. A refrigerating apparatus comprising:
   (i) an evaporator
   (ii) a compressor
   (iii) a condenser (iv) means defining passages forming with the evaporator and the compressor and the condenser a closed circuit containing a refrigerant fluid
(v) an induction motor coupled to and serving to drive the compressor, said motor having a stator and a rotor
(vi) a housing enclosing the stator and rotor
(vii) a heat exchanger
(viii) means defining passages forming with the housing and the heat exchanger a closed circuit containing a coolant liquid, the evaporator and the heat exchanger being spatially disposed one adjacent the other such that heat transfer may take place from the heat exchanger to the evaporator.

* * * * *